Figure 1A:
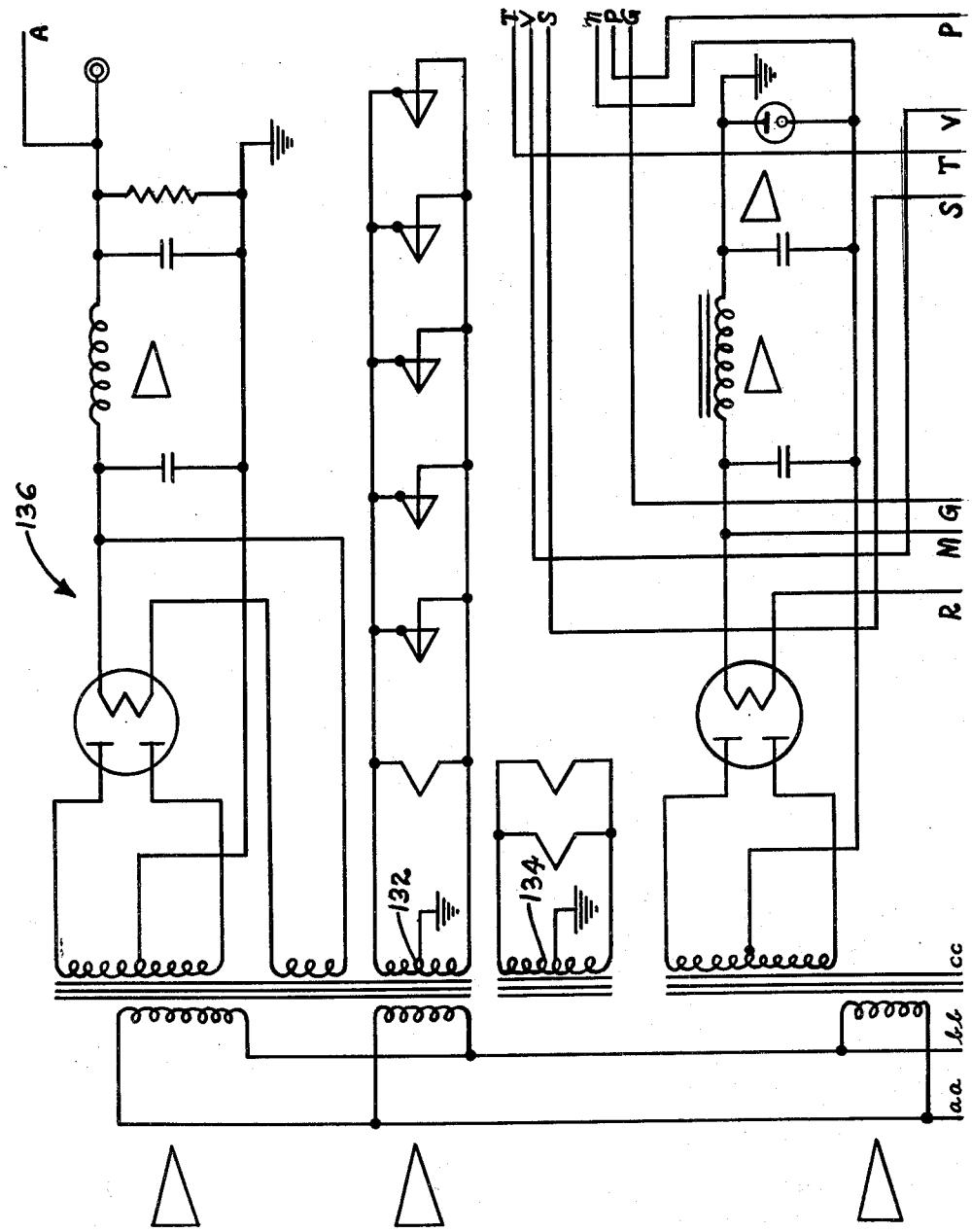
Figure 1C:
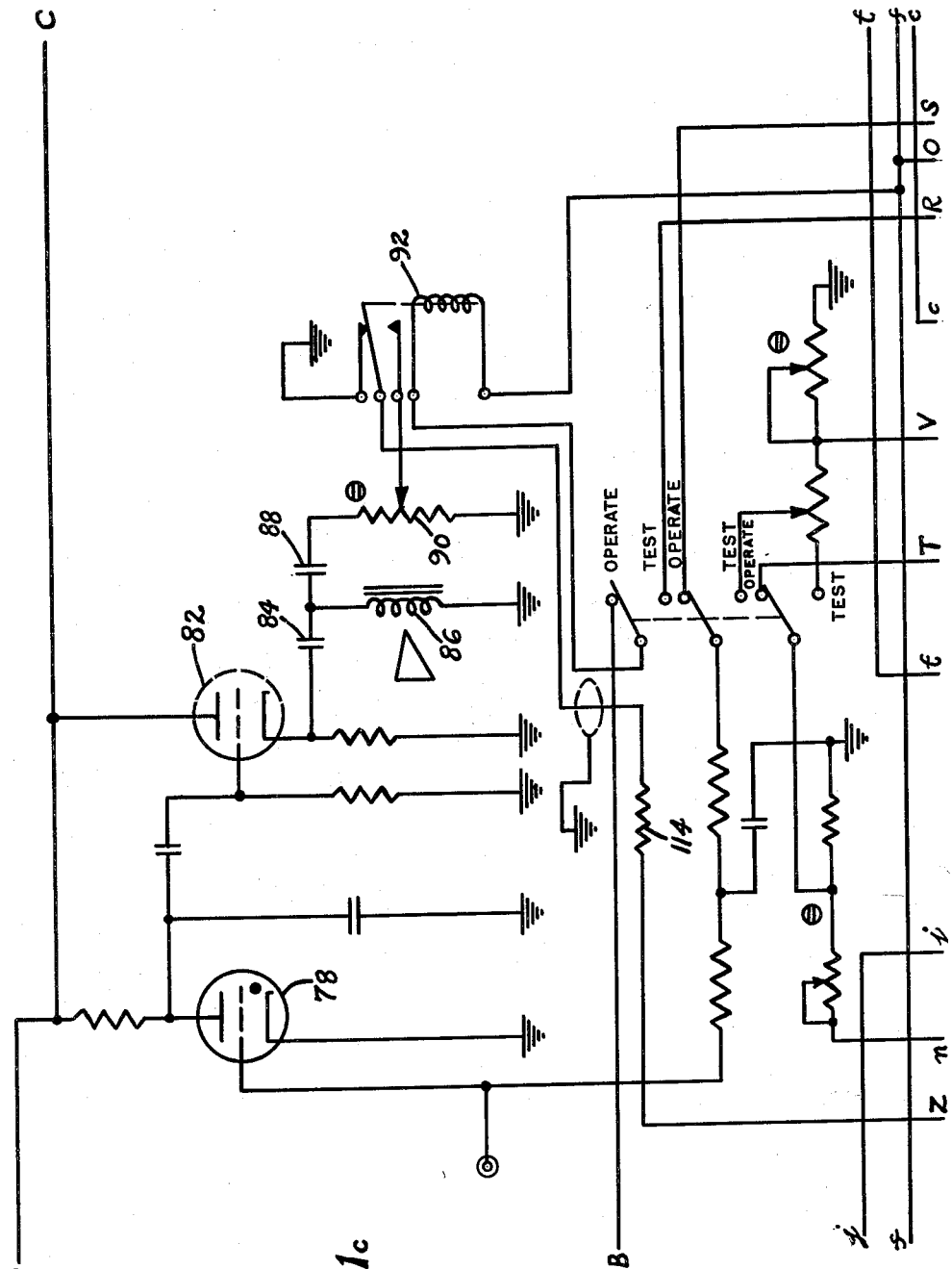

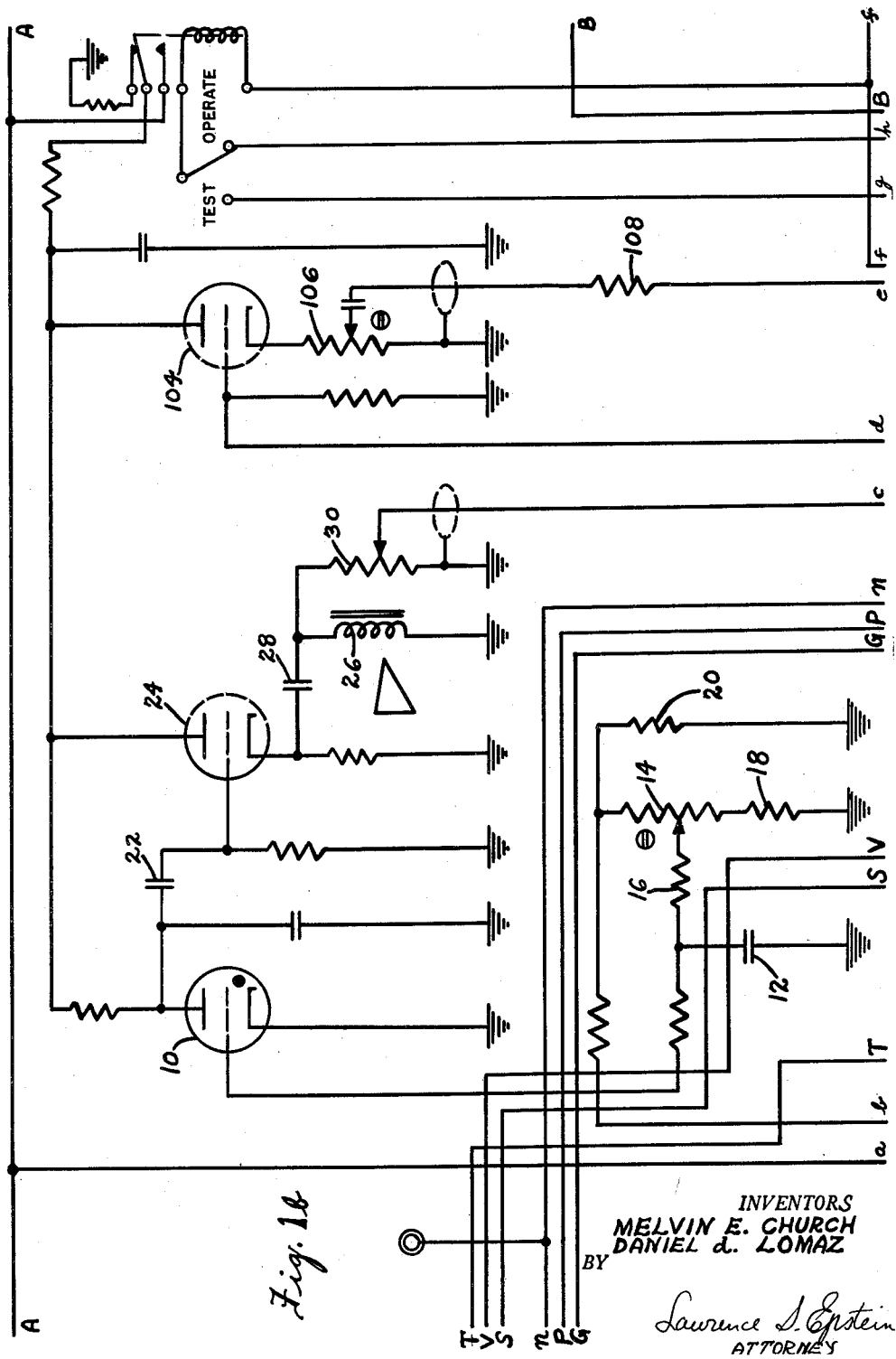

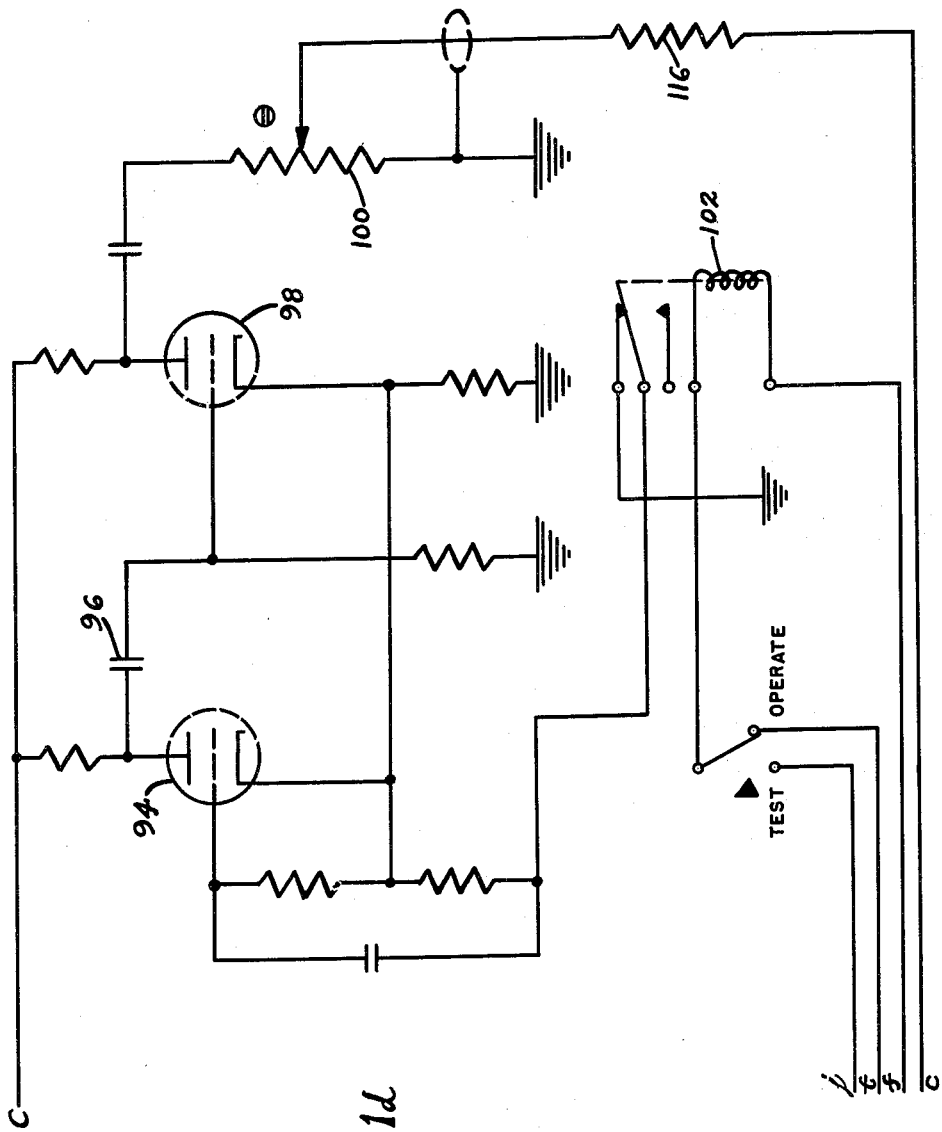

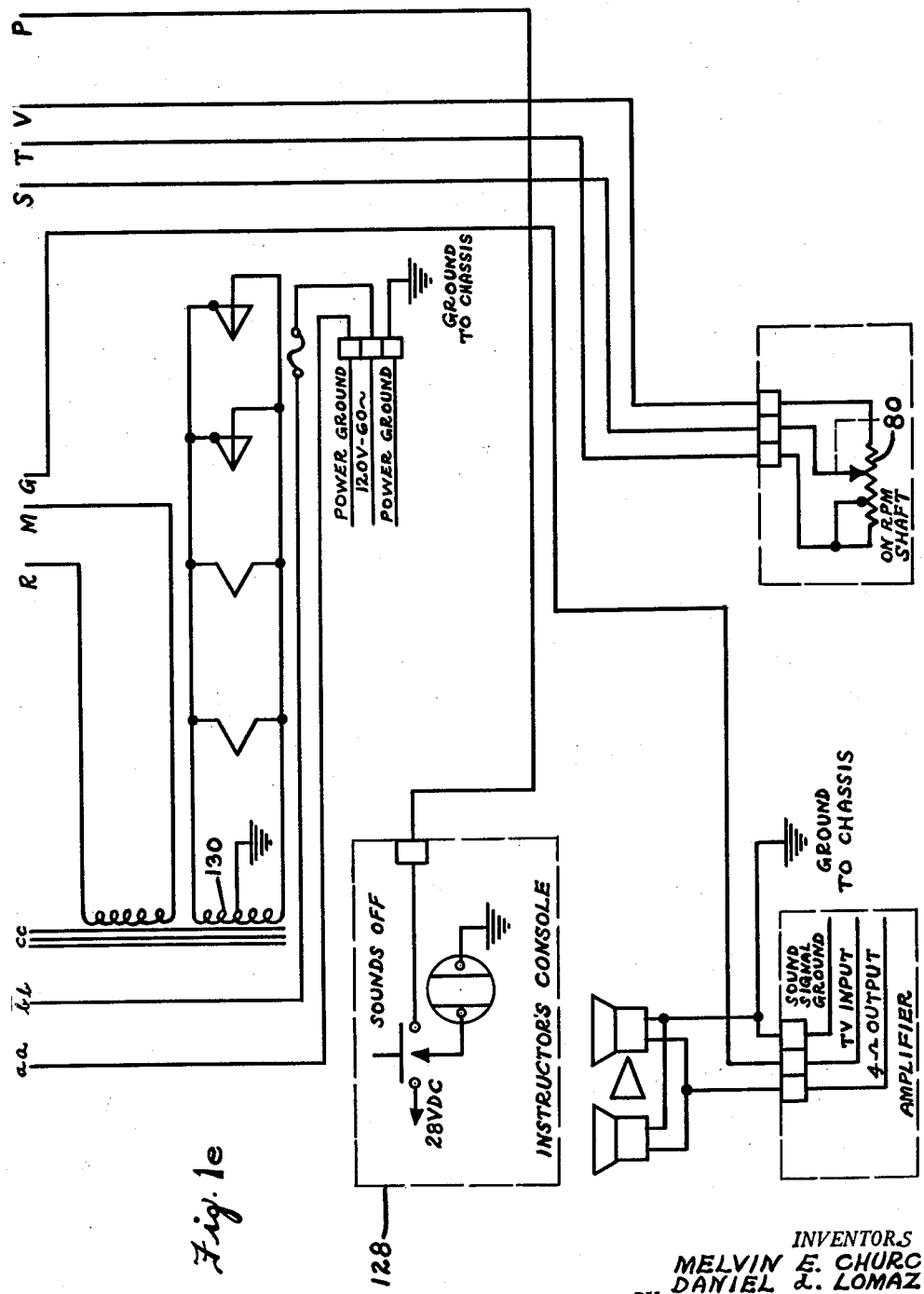

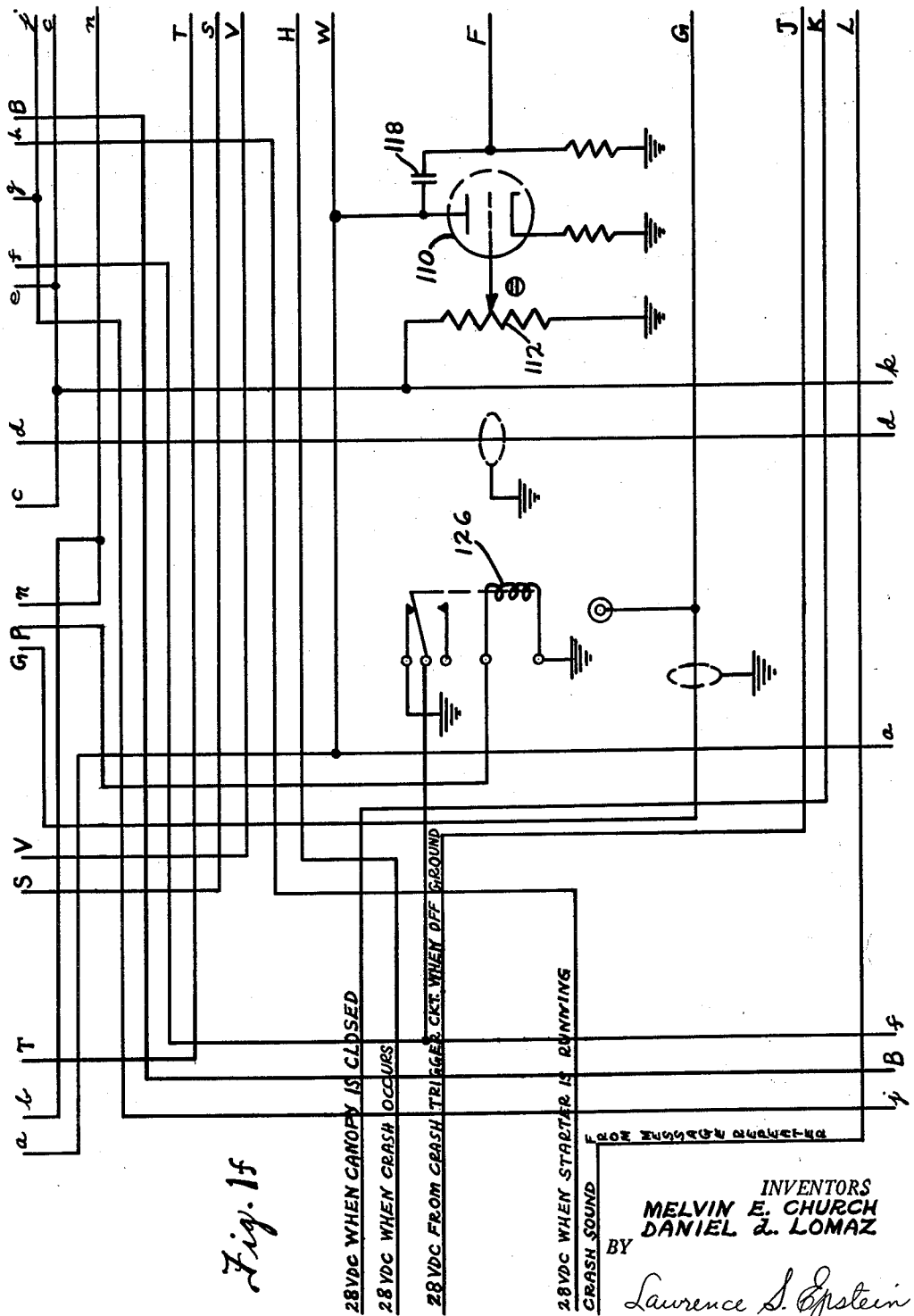

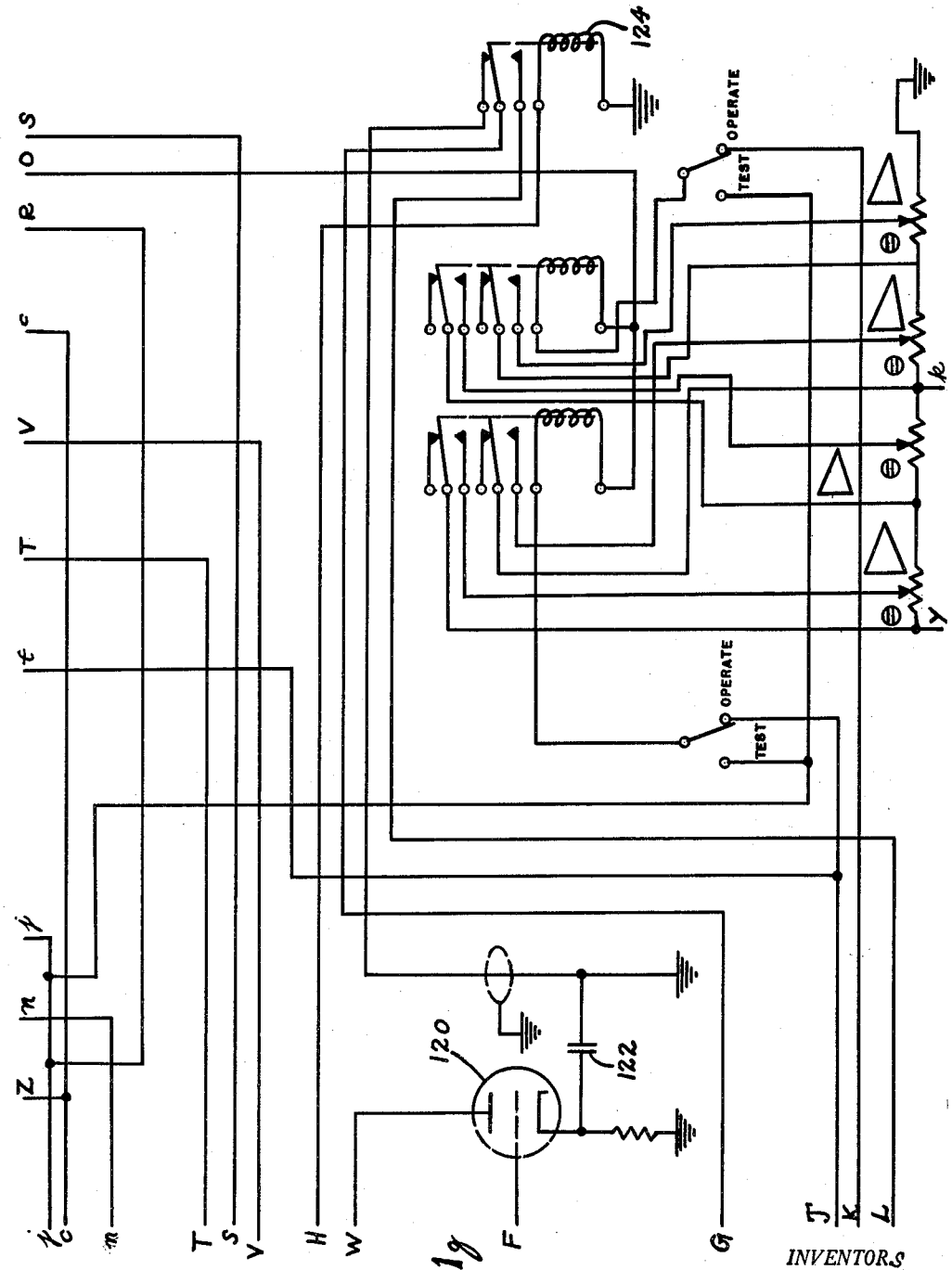

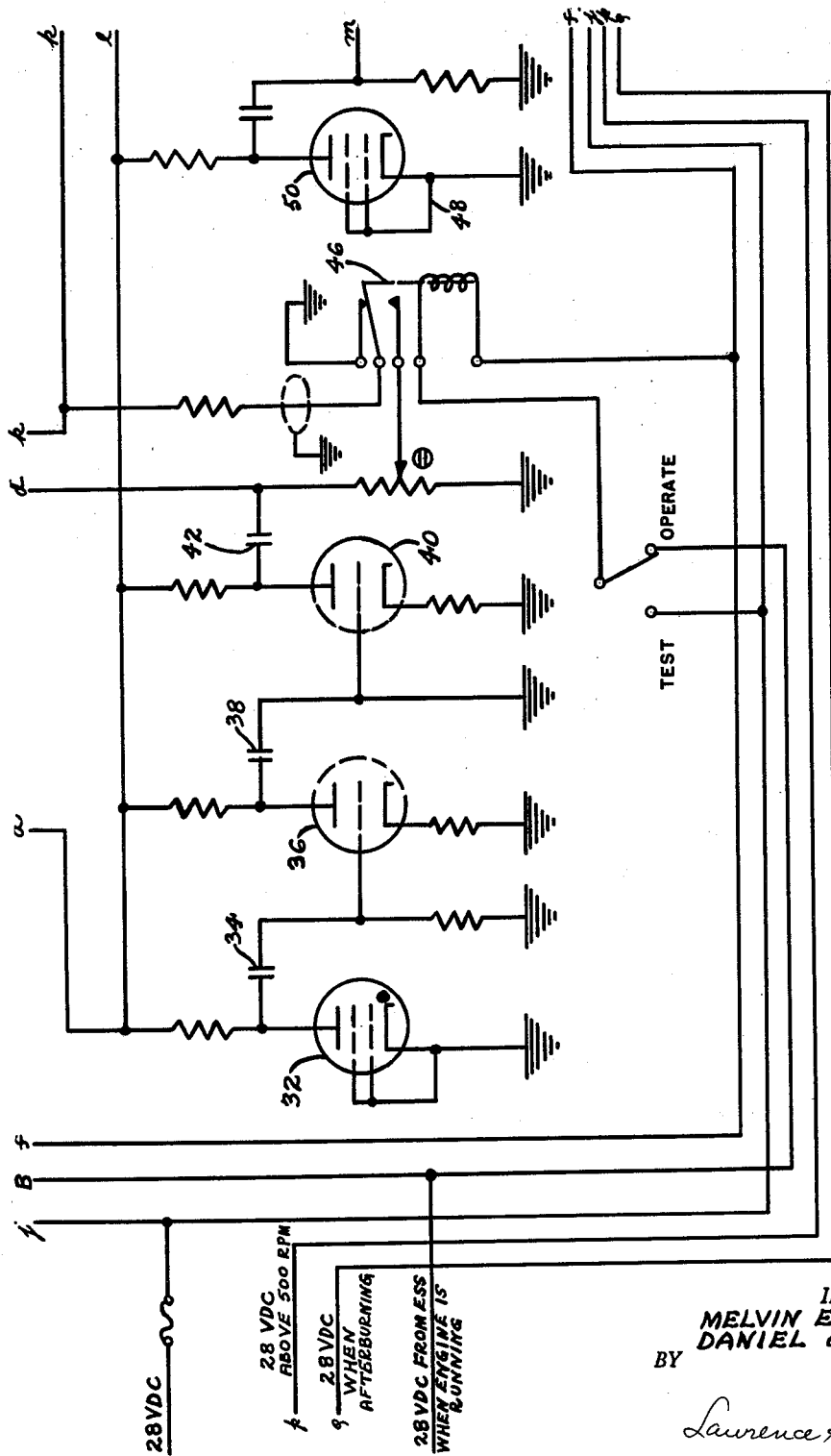

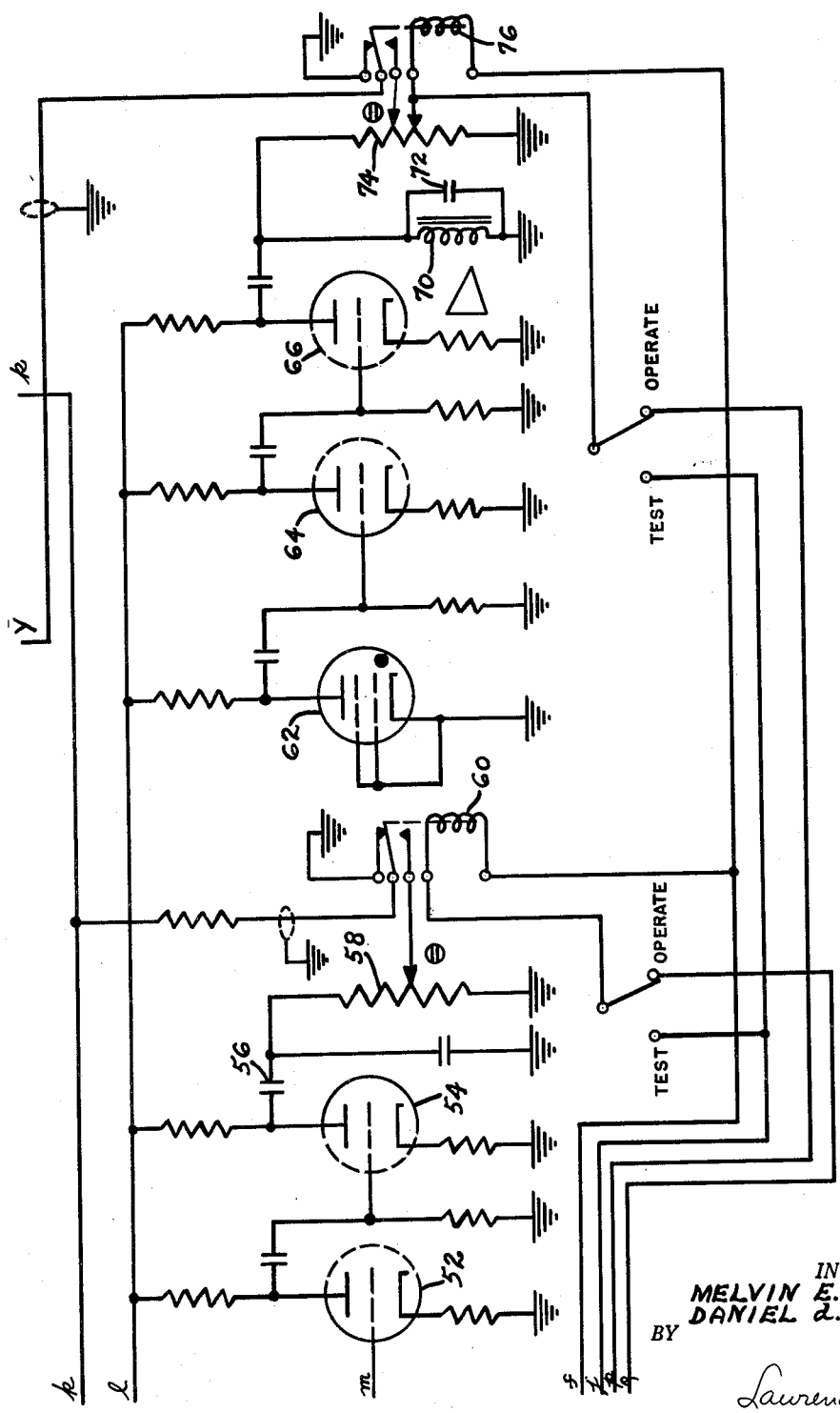

United States Patent Office 3,107,438
Patented Oct. 22, 1963

3,107,438
SOUND SIMULATION SYSTEM
Melvin E. Church, Akron, and Daniel D. Lomaz, Cleveland, Ohio, assignors, by mesne assignments, to the United States of America as represented by the Secretary of the Navy
Filed Nov. 29, 1960, Ser. No. 72,538
2 Claims. (Cl. 35—12)

This invention relates to devices for simulating the noises encountered within a jet aircraft during operation and is intended for use in conjunction with operational flight trainer devices such as the F3H–2N Operational Flight Trainer.

This noise simulator is utilized for the purpose of subjecting the trainee to the actual noises which he will encounter under normal operating conditions.

It is an object of this invention to provide an electrical apparatus for realistically simulating the noises encountered within a jet aircraft during normal operation.

It is a further object to provide realistic simulation of noises encountered within a jet aircraft, said noises occurring in conjunction with the operation of various controls, just as these noises occur during the actual operation of the aircraft.

Another object of the invention is to provide an improved sound simulation device to simulate the sound characteristics of the starter, the wind noises during flight, the turbine whine, the after-burner noise, the ventilation noises, the tire screeches and crash noises for an operational flight jet trainer.

A further object of the instant invention is to provide a light weight, flexible, low cost sound simulation system for operational flight trainers.

Other objects and many of the attendant advantages of this invention will be readily appreciated as the same becomes better understood by reference to the following detailed description when considered in connection with the accompanying drawing wherein the single FIGURE comprising portions 1a through 1i, is a schematic diagram of the sound simulation system.

Referring to the drawing, the invention comprises a power supply, a starter noise simulator, a turbo-whine noise simulator, a tire screech noise simulator, a crash and transfer relay noise simulator, a ventilation sound noise simulator, an after-burner sound simulator and a flight contact noise simulator. All of these different noise simulators combine to form the sound simulation system of the instant invention.

The starter sound simulates the sound of a small jet engine which is normally used to drive a compressor for the external air supply. This sound will be constant in amplitude and the turbine whine part of the sound will be constant in frequency. A frequency adjustment is provided in the circuitry. The starter turbine whine and the starter noise generators have separate output level controls.

The turbine whine sound for the main jet engine is constant in amplitude but variable in frequency. The frequency is controlled by a potentiometer within the circuitry. The frequency varies from approximately 1,500 cycles per second at the start to 6,100 cycles per second at maximum revolutions per minute. A potentiometer adjustment is provided to enable testing of the sound simulation system through the complete revolutions per minute range. Frequency adjustments are provided for both the turbine whine and starter sound simulations. Tube 10 is a gas thyratron which operates as a resistance-capacitance oscillator at a fixed frequency. The frequency determining elements for this oscillator comprise capacitor 12 and resistors 14, 16 and 18 in combination with resistor 20. The variable resistor 14 is used as a frequency adjustment for the oscillator. The output of the oscillator is applied through capacitor 22 to the grid of cathode follower tube 24. The output from tube 24 is filtered by a bypass filter comprising inductor 26 and capacitor 28. The resistor 30 which is across the bypass filter is used to adjust the output level applied to the mixing circuit of the sound simulation device. Tube 32 is a random noise generator. The noise is produced by the ionized gas within the tube. This tube has its grids and cathode connected so that it operates as a diode. The noise output from tube 32 is coupled through capacitor 34 to amplifier stage 36. The noise is amplified by stage 36 and coupled through capacitor 38 to the second amplifier stage 40. The amplified noise from amplifier stage 40 is coupled through capacitor 42 and across the level control 44 to flight sound relay 46. The noise signal applied to flight sound relay 46 represents the flight sound level and its level is controlled by level control 44. Random noise generator tube 48 is identical in operation to random noise generator tube 32. The output from random noise generator 48 is coupled through capacitor 50 and then to amplifier tubes 52 and 54. Amplifier tubes 52 and 54 operate in identical fashion respectively to amplifier tubes 36 and 40. The output from amplifier tube 54 is coupled through capacitor 56 and across variable potentiometer 58 to after-burner sound relay 60. Variable potentiometer 58 is used to control the output level from amplifier tube 54. The output across level control 58 represents the after-burner sound level. Tube 62 is another random noise gas tube generator whose operation is identical to that of tube 32. The output from noise generator tube 62 is applied to amplifier tubes 64 and 66 which operate in identical fashion to amplifier tubes 36 and 40 respectively. The noise output from noise amplifier stage 66 is coupled through capacitor 68 to a bypass filter comprising inductor 70 and capacitor 72. The bypass filter acts to restrict the frequency spectrum of the noise to a narrow range which represents the frequency range of cockpit ventilation sounds. This filtered noise is applied across variable potentiometer 74 to relay 76. Variable potentiometer 74 acts to control the output level of the cockpit ventilation sounds. Gas triode tube 78 operates as an oscillator at a fixed frequency in identical fashion to oscillator tube 10. The frequency produced by oscillator stage 78 is controlled by variable potentiometer control 80 which is located on the engine r.p.m. shaft. The output of oscillator 78, is applied to cathode follower stage 82. The output from cathode follower stage 82 is coupled through capacitor 84 through a bypass filter comprising inductor 86 and capacitor 88 and then applied across variable potentiometer 90. The output for potentiometer 90 goes to turbine whine relay 92. Variable potentiometer 90 controls the turbine whine output level applied to relay 92. Tube stage 94 is a blocking oscillator which provides a large transient output to represent tire screech at the instant of a "touch down" on landing. The output of tube 94 is coupled through capacitor 96 to amplifier stage 98. The output from amplifier stage 98 is controlled by tire screech level potentiometer 100. Operating voltage for relay 102 upon simulated touch down, causes blocking oscillator 94 to operate thereby generating the tire screech transient. Part of the output from flight sound amplifier 40 is coupled through capacitor 42 and applied to level cathode follower stage 104. The output from stage 104 is coupled through capacitor 106 and resistor 108 to the grid of mixer stage 110 across mixer level input control 112. The output from starter whine level control 30 is also coupled to the grid of mixer stage 110. The output from turbine whine level control 90 through turbine whine relay 92 is coupled to the grid of mixer stage 110 through resistor 112. The output from tire screech level control 100 is coupled to the grid of mixer stage 110 through resistor 116. Thus, we have the starter whine, the starter noise, the turbine whine and tire screech all being applied to the input of mixer stage 110. These input signals are amplified by stage 110 and applied through capacitor 118 to the grid of cathode follower tube 120. The output of cathode follower stage 120 is applied through capacitor 122 and through crash and transfer relay 124 to the speaker system of the training device. When the crash relay 124 operates upon the simulation of a crash, the outputs from the sound simulation device are disconnected from the speaker system and a prerecorded crash sound is applied to the speaker system of the trainer. The output from the flight sound relay 46 and the after-burner sound relay 60 and the ventilation sound relay 76 are all applied to the input of the mixer stage 110. Each of the output relays from each of the different sound simulation circuits are able to be operated individually for test purposes when one of the switches labeled "Test" and "Operate" is in the test position the associated relay will be energized thereby coupling the output of the particular noise means to be tested to the mixer 110. Sounds-off relay 126 removes the ground connection from all of the output relays of each of the sound simulation circuits in order to turn off all the sounds. This is accomplished from the instructor's console by means of switch 128. The filament voltage for the tubes of the sound simulation system is supplied by transformers 130, 132 and 134. The +300 volt D.C. is supplied by power supply 136. The −150 volts is supplied by power supply 138.

The land contact relay and canopy open relay are used to attenuate sound level according to the existing conditions. A crash relay cuts off all sound if a crash occurs. Thus, with the activation of the proper relay in conformance with the normal operation of a jet aircraft the sounds occurring in a jet aircraft in normal and crash operations are realistically simulated.

Obviously many modifications and variations of the present invention are possible in the light of the above teachings. It is therefore to be understood that within the scope of the appended claims the invention may be practiced otherwise than as specifically described.

What we claim is:
1. A device for realistically simulating the sound in a jet aircraft comprising:
  electronic sound generating means including
    means for generating starter noise,
    means for generating turbine whine noise,
    means for generating after-burner noise,
    means for generating ventilation noise,
    means for flight noise,
    means for generating tire screech noise;
  relay means operatively connected to said noise means for on and off control thereof;
  first amplifier means;
  means for mixing said different noise means and applying the output of said mixer means to the input of said first amplifier means;
  control means coupled to said noise means for controlling the application of said individual noise means to said mixing means; and
  means for simultaneously transmitting crash sounds to said first amplifier means and for simultaneously disconnecting said noise means from said first amplifier means upon a simulated crash occurrence;
  said means for generating turbine whine noise comprising,
    means for generating random noise which includes,
      a source of random noise,
      potentiometer means coupled to said source of random noise for controlling the frequency thereof,
      motor means operatively connected to said potentiometer means for effectively varying the frequency of said source of random noise thereby simulating the noise resulting from the r.p.m. variation in the turbine,
    second amplifier means for amplifying said random noise, and
    filter means coupled to the output of said second amplifier means for passing only the desired sounds.

2. The device as claimed in claim 1, comprising test means operatively coupled to the output of each of noise means whereby each of said noise means may be individually tested.

References Cited in the file of this patent
UNITED STATES PATENTS

| | | |
|---|---|---|
| 2,445,712 | Forbes | July 20, 1948 |
| 2,470,468 | Buchanan | May 17, 1949 |
| 2,483,226 | Newmann | Sept. 27, 1949 |
| 2,490,487 | Stevens | Dec. 6, 1949 |
| 2,494,594 | Swank | Jan. 17, 1950 |
| 2,521,405 | Phelps | Sept. 5, 1950 |
| 2,533,484 | Lukacs | Dec. 12, 1950 |
| 2,584,261 | Davis et al. | Feb. 5, 1952 |
| 2,608,005 | Kennedy | Aug. 26, 1952 |
| 2,639,386 | Karpeles | May 19, 1953 |
| 2,731,737 | Stern | Jan. 24, 1956 |
| 2,751,585 | Hathaway | June 19, 1956 |
| 2,768,371 | Konrad | Oct. 23, 1956 |
| 2,898,587 | Nye | Aug. 4, 1959 |
| 2,974,424 | Roberts | Mar. 14, 1961 |